United States Patent
Hestekin et al.

(10) Patent No.: US 10,651,493 B2
(45) Date of Patent: May 12, 2020

(54) REVERSE ELECTRODIALYSIS SYSTEMS COMPRISING WAFER AND APPLICATIONS THEREOF

(71) Applicant: THE BOARD OF TRUSTEES OF THE UNIVERSITY OF ARKANSAS, Little Rock, AR (US)

(72) Inventors: Jamie Hestekin, Fayetteville, AR (US); Hailey Dunsworth, Farmington, AR (US); Alexander Lopez, Fayetteville, AR (US)

(73) Assignee: The Board of Trustees of the University of Arkansas, Little Rock, AR (US)

(*) Notice: Subject to any disclaimer, the term of this patent is extended or adjusted under 35 U.S.C. 154(b) by 287 days.

(21) Appl. No.: 14/896,549

(22) PCT Filed: Jun. 6, 2014

(86) PCT No.: PCT/US2014/041343
§ 371 (c)(1),
(2) Date: Dec. 7, 2015

(87) PCT Pub. No.: WO2014/197824
PCT Pub. Date: Dec. 11, 2014

(65) Prior Publication Data
US 2016/0133981 A1 May 12, 2016

Related U.S. Application Data

(60) Provisional application No. 61/832,388, filed on Jun. 7, 2013.

(51) Int. Cl.
*H01M 8/22* (2006.01)
*B01D 61/48* (2006.01)

(52) U.S. Cl.
CPC .......... *H01M 8/227* (2013.01); *B01D 61/485* (2013.01)

(58) Field of Classification Search
CPC .................................................. H01M 8/227
See application file for complete search history.

(56) References Cited

U.S. PATENT DOCUMENTS

| 6,495,014 B1 | 12/2002 | Datta et al. | |
| 2004/0060875 A1* | 4/2004 | Lin | B01D 61/445 210/685 |

(Continued)

FOREIGN PATENT DOCUMENTS

| WO | WO0112292 | * | 2/2001 |
| WO | 2008108633 A1 | | 9/2008 |

(Continued)

OTHER PUBLICATIONS

Notification of Transmittal of the International Search Report and the Written Opinion of the International Searching Authority and International Search Report for corresponding PCT Application No. PCT/US2014/041343, dated Oct. 8, 2014, 11 pages.

*Primary Examiner* — Christopher P Domone
(74) *Attorney, Agent, or Firm* — J. Clinton Wimbish; Nexsen Pruet, PLLC

(57) ABSTRACT

In one aspect, reverse electrodialysis systems are described herein having constructions operable to reduce membrane stack resistance, thereby requiring significantly less membrane surface area for meaningful electrical power generation. A reverse electrodialysis system described herein comprises an anode and cathode adjacent to a membrane stack, the membrane stack comprising alternating anion and cation exchange membranes defining diluate and concentrate ionic solution compartments, wherein an ion exchange medium is positioned in a diluate compartment.

20 Claims, 2 Drawing Sheets

(56) References Cited

U.S. PATENT DOCUMENTS

2006/0063849 A1  3/2006  Lin et al.
2010/0300894 A1  12/2010  Lin et al.
2015/0311558 A1* 10/2015  Van Baak ............. H01M 8/227
                                                    429/417

FOREIGN PATENT DOCUMENTS

WO    WO2008108633    *  9/2008
WO    2009077992 A2     6/2009

* cited by examiner

REVERSE ELECTRODIALYSIS SYSTEMS COMPRISING WAFER AND APPLICATIONS THEREOF

RELATED APPLICATION DATA

The present application is a U.S. National Phase of International Application No. PCT/US2014/041343, filed Jun. 6, 2014, which hereby claims priority pursuant to 35 U.S.C. § 119(e) to U.S. Provisional Patent Application Ser. No. 61/832,388 filed Jun. 7, 2013, each of which is incorporated herein by reference in its entirety.

FIELD

The present invention relates to reverse electrodialysis systems and, in particular, to reverse electrodialysis systems employing ion exchange media independent of the ion exchange membranes.

BACKGROUND

With the increasing controversy surrounding fossil fuel based emissions, significant resources are being devoted to developing alternative and renewable energies. Energy production from salinity gradients has been known for several decades and offers significant advantages of carbonless emissions and renewability. Two leading methods of energy production from salinity gradients are pressure retarded osmosis (PRO) and reverse electrodialysis (RED). Reverse electrodialysis functions on the basis of salinity differences in mixing solution such as sea water and river water. A membrane stack is sandwiched by electrodes and composed of alternating salt water and freshwater compartments defined by anion and cation exchange membranes permitting selective exchange of ions between the compartments. Driven by the difference in chemical potential between the salt water and freshwater solutions, cations diffuse through the cation exchange membranes toward the cathode and anions diffuse through the anion exchange membranes toward the anode. At the electrodes, a redox couple is used to mitigate the transfer of electrons. Therefore, when electrodes are connected to an external circuit, electrical power can be extracted from the reverse electrodialysis system.

The theoretical power density of reverse electrodialysis systems is in the neighborhood of 20 W/m$^2$. In actual implementation, however, the power density drops significantly to 1-3 W/m$^2$ in the most efficient systems. The precipitous drop in power density can be attributed to several factors including resistances through the cation and anion exchange membranes, electrode resistance and power consumed in plant operation. In order to compensate for these losses, significant membrane area is required. This can be prohibitive given the high cost and limited lifetimes of suitable cation and anion exchange membranes.

SUMMARY

In one aspect, reverse electrodialysis systems are described herein having constructions operable to reduce membrane stack resistance, thereby requiring significantly less membrane surface area for meaningful electrical power generation. A reverse electrodialysis system described herein comprises an anode and cathode adjacent to a membrane stack, the membrane stack comprising alternating anion and cation exchange membranes defining diluate and concentrate ionic solution compartments, wherein an ion exchange medium is positioned in a diluate compartment. In some embodiments, the anion and cation exchange membranes define a plurality of diluate compartments and concentrate compartments, wherein the ion exchange medium is positioned within the diluate compartments.

In another aspect, methods of making reverse electrodialysis systems are described herein. A method of making a reverse electrodialysis system comprises providing a membrane stack comprising alternating anion and cation exchange membranes defining diluate and concentrate ionic solution compartments. An ion exchange medium is positioned in the diluate compartment and an anode and cathode are positioned adjacent to the membrane stack. In some embodiments, the anion and cation exchange membranes define a plurality of diluate compartments and concentrate compartments wherein the ion exchange medium is positioned in the diluate compartments.

In another aspect, methods of generating electrical current are described herein. A method of generating electrical current comprises providing a reverse electrodialysis system comprising an anode and cathode adjacent to a membrane stack, the membrane stack comprising alternating anion and cation exchange membranes defining diluate and concentrate ionic solution compartments, wherein an ion exchange medium is positioned in the diluate compartment. Dilute ionic solution is flowed into the diluate compartment and concentrated ionic solution is flowed into the concentrate compartment. Anions from the concentrated ionic solution are passed through the anion exchange membrane in a direction toward the anode and cations from the concentrated ionic solution are passed through the cation exchange membrane in a direction toward the cathode. An external electrical circuit is connected to the anode and cathode to extract electrical current from the reverse electrodialysis system.

In some embodiments, the anion and cation exchange membranes define a plurality of diluate compartments and concentrate compartments, wherein the ion exchange medium is positioned in the diluate compartments. Dilute ionic solution is flowed into the diluate compartments and concentrated ionic solution is flowed into the concentrate compartments. Anions from the concentrated ionic solution are passed through the anion exchange membranes in a direction toward the anode and cations from the concentrated ionic solution are passed through the cation exchange membranes in a direction toward the cathode. An external electrical circuit is connected to the anode and cathode to extract electrical current from the reverse electrodialysis system.

In a further aspect, a method of reducing membrane stack resistance in a reverse electrodialysis system is described herein. Such a method comprises positioning an ion exchange medium in one or more diluate compartments of the electrodialysis system, wherein the stack resistance is reduced by at least an order of magnitude relative to an identical or substantially identical membrane stack not employing the ion exchange medium.

These and other embodiments are further described in the detailed description which follows.

DETAILED DESCRIPTION

Figure 1:
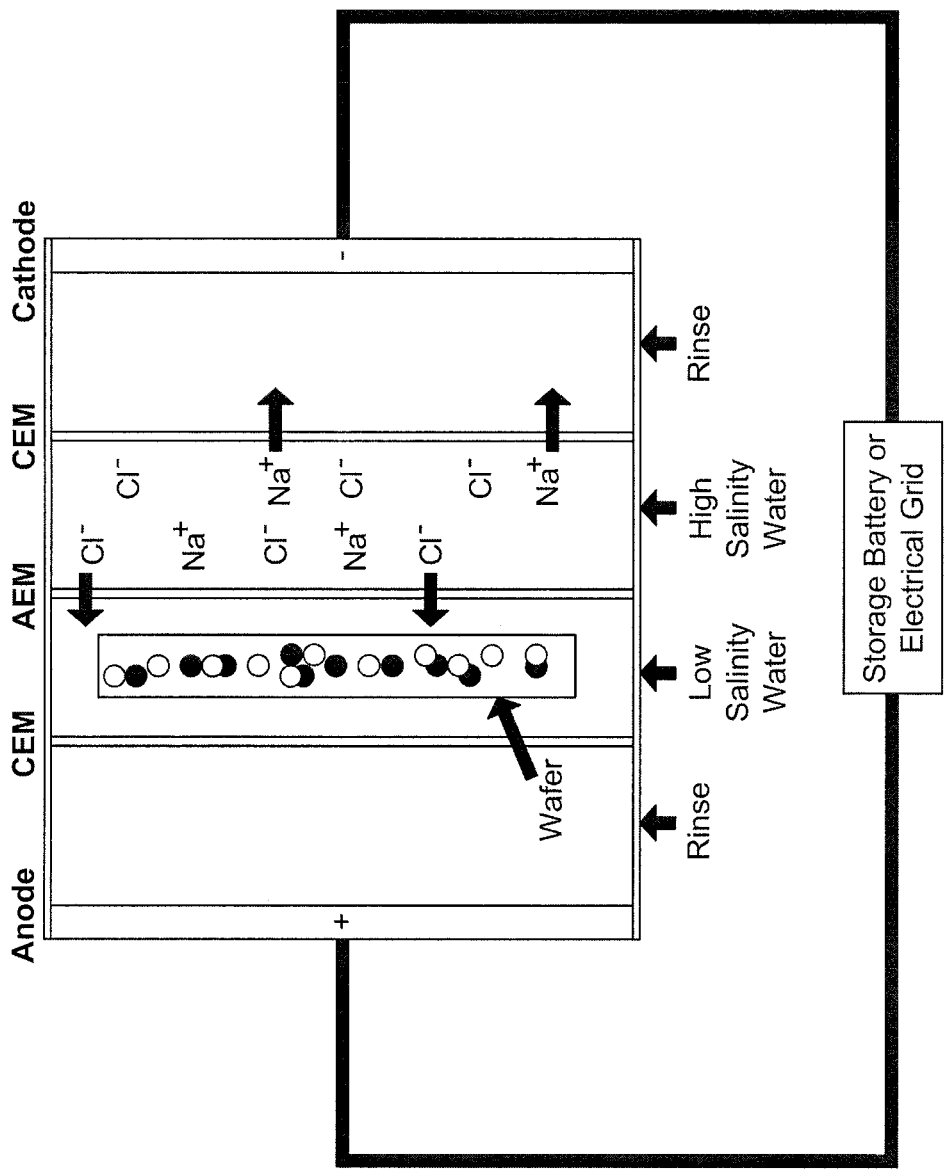
FIG. 1 illustrates a reverse electrodialysis system according to one embodiment described herein.

Embodiments described herein can be understood more readily by reference to the following detailed description and example and their previous and following descriptions. Elements, apparatus and methods described herein, however, are not limited to the specific embodiments present in the detailed description and examples. It should be recognized that these embodiments are merely illustrative of the principles of the present invention. Numerous modifications and adaptations will be readily apparent to those of skill in the art without departing from the spirit and scope of the invention.

I. Reverse Electrodialysis Systems

In one aspect, reverse electrodialysis systems are described herein having constructions operable to reduce membrane stack resistance, thereby requiring significantly less membrane surface area for meaningful electrical power generation. A reverse electrodialysis system described herein comprises an anode and cathode adjacent to a membrane stack, the membrane stack comprising alternating anion and cation exchange membranes defining diluate and concentrate ionic solution compartments, wherein an ion exchange medium is positioned in a diluate compartment. In some embodiments, the anion and cation exchange membranes define a plurality of diluate compartments and concentrate compartments, wherein the ion exchange medium is positioned within the diluate compartments.

Turning now to specific components, a reverse electrodialysis system described herein comprises an anode and cathode adjacent to a membrane stack. The anode and cathode can be constructed of any material and have any dimensions not inconsistent with the objectives of the present invention. For example, the cathode and/or anode can be formed of a material selected from the group consisting of lead, $PbO_2$, titanium, $PbO_2$ on titanium, platinum on titanium, iridium on titanium, stainless steel, iron, zinc, nickel, copper, other metals and alloys thereof.

As described herein, the membrane stack of the reverse electrodialysis system comprises alternating anion and cation exchange membranes defining diluate and concentrate ionic solution compartments. In some embodiments, the alternating anion and cation exchange membranes define a single diluate compartment and a single concentrate compartment. Moreover, the alternating anion and cation exchange membranes can define a plurality of diluate compartments and a plurality of concentrate compartments. The membrane stack can have any desired number of anion and cation exchange membranes not inconsistent with the objectives of the present invention. The number of anion and cation exchange membranes can be selected according to several considerations including the desired number of diluate and concentrate compartments in the system. For example, the number of anion and cation exchange membranes in a reverse electrodialysis system described herein can sum to a value up to 400 or 500.

Anion exchange membranes for use in reverse electrodialysis systems described herein include membranes under the FUMASEP® trade designation, such as FUMASEP® FAS and FAB. Suitable anion exchange membranes also include Tokuyama NEOSEPTA® membranes such as Tokuyama AMX, AMH and ACM. Anion exchange membranes are also commercially available from Ameridia. Typical properties of anion exchange membranes employed in reverse electrodialysis systems described herein are provided in Table I.

TABLE I

| Anion Exchange Membrane Properties | |
|---|---|
| Ion Exchange Capacity | 0.6-2.0 meq/g |
| Selectivity | >90% |
| Ohmic Resistance | <10 Ω-cm |
| Thickness | 0.5-5 mm |

Cation exchange membranes for use in reverse electrodialysis systems described herein also include membranes under the FUMASEP® trade designation, such as FUMASEP® FKS and FKE. Suitable cation exchange membranes can be obtained from Tokuyama such as Tokuyama CMX, CMS and CMB. Typical properties of cation exchange membranes employed in reverse electrodialysis systems described herein are provided in Table II.

TABLE II

| Cation Exchange Membrane Properties | |
|---|---|
| Ion Exchange Capacity | 0.6-2.0 meq/g |
| Selectivity | >90% |
| Ohmic Resistance | <10 Ω-cm |
| Thickness | 0.5-5 mm |

The anion and cation membranes define diluate and concentrate compartments for receiving dilute ionic solution and concentrated ionic solution respectively. The diluate and concentrate compartments can have any dimensions not inconsistent with the objectives of the present invention. Compartment dimensions can be selected according to several considerations including ionic solution flow rates. Further, the terms dilute ionic solution and concentrated ionic solution herein are used relative to one another. For example, concentrated ionic solution in embodiments described herein demonstrates an ionic concentration higher than the dilute ionic solution. Concentrated and dilute ionic solutions, in some embodiments, have salinity concentrations of 0.0001-30% total dissolved solids with the concentrated ionic solution salinity exceeding the dilute ionic solution salinity. In some embodiments, salinity of the concentrated ionic solution exceeds salinity of the dilute ionic solution by at least a factor of 5. Moreover, pH of the dilute and concentrated ionic solutions can be controlled within a range of 2-12 to avoid damage to the ion exchange membranes.

Dilute and concentrated ionic solutions for use in reverse electrodialysis systems described can be obtained from various sources. In some embodiments, dilute ionic solutions are sourced from bodies of fresh water such as lakes, rivers and/or streams. Similarly, concentrated ionic solutions can be sourced from saltwater bodies such as oceans and seas. For ease of system operation, the freshwater and salt water bodies can be adjacent to one another in the environment. Reverse electrodialysis systems, for example, can be located along estuaries or other areas where fresh and salt water bodies meet. Alternatively, dilute and/or concentrated ionic solutions can be obtained from manmade sources. In some embodiments, concentrated ionic solutions are sourced from water employed in hydraulic fracturing (fracking) operations for extracting natural gas and shale oil deposits from the earth. Locating reverse electrodialysis at hydraulic fracturing sites can permit use of the systems to power equipment used in the fracturing operation.

Ions of the diluted and concentrated ionic solutions can be monovalent of multivalent. Cations, for example, can include alkali metal and/or alkaline earth metal ionic species. Anions of the ionic solutions can comprise halides as well as other counter anionic species commonly found in salt and fresh water bodies.

Reverse electrodialysis systems described herein also comprise an ion exchange medium positioned in one or more diluate compartments of the membrane stack. In being disposed in diluate compartment(s), the ion exchange medium is a separate component independent of the anion and cation exchange membranes defining the diluate compartment(s). The ion exchange medium can have any compositional identity and form not inconsistent with the objectives of the present invention. For example, the ion exchange medium can comprise anion exchange resin, cation exchange resin or mixtures thereof. When comprising a combination of anion and cation exchange resins, the ratio of anion resin to cation resin in the medium can range from 0.1:99.9 to 99.9:0.1. In some embodiments, the ratio of anion resin to cation resin in the medium is 25:75 or 50:50.

Cation exchange resin of the ion exchange medium can comprise strong or weak acid ion resin. Suitable commercially available strong acid resins include Amberlite IR-120, Amberlite IRP-69, Amberlite IR-118, DOWEX MARATHON 650C (H) and DOWEX MONOSPHERE C-350. Suitable commercially available weak acid resins include Amberlite FPC3500, Amberlite Cobalamion, Amberlite IRC86, DOWEX MAC-3 and IMAC HP336.

Anion exchange resin of the ion exchange medium can comprise strong or weak base ion resin. Suitable commercially available strong base resins include Amberlite IR-400, DOWEX MARATHON A, DOWEX UPCORE Mono MA-600, AMBERJET 4400 OH and Amberlite FPA90 Cl. Suitable commercially available weak base resins include Amberlite FPA51, Amberlite IRA67, IMAC HP661, DOWEX 66 and DOWEX M4195.

The ion exchange medium can be provided in various forms. In some embodiments, the ion exchange medium is provided as a wafer for positioning in a diluate compartment. The wafer formed of anion exchange resin, cation exchange resin or mixtures thereof can have a porosity of 30-60% or 40-50%. Further, the wafer can demonstrate a surface area of at least 400 m$^2$/g. In some embodiments, for example, a wafer ion exchange medium has a surface area of 400-700 m$^2$/g. Additional properties of a wafer ion exchange medium are provided in Table III.

TABLE III

| Ion Exchange Medium Properties | |
|---|---|
| Ion Exchange Capacity | ≥2.0 meq/g |
| Fixed Charge Density | 1-2.6 meq/l |
| Thickness | 0.5-5 mm |

Wafer synthesis, in some embodiments, is conducted by creating a mixture of anion exchange resin and/or cation exchange resin, polymer and sugar. The mixture is placed in a pneumatic press at elevated temperature and pressure for a time period sufficient to form the wafer. The wafer is cooled and submersed in water or other medium operable to dissolve the sugar, forming the pore structure of the ion exchange wafer. The wafer can be subsequently cut or otherwise worked to dimensions for placement in a diluate compartment. In some embodiments, the wafer is provided dimensions and/or shape substantially matching spacers used in membrane stacks, thereby permitting the wafer to replace spacers in membrane stacks.

In addition to wafer form, the ion exchange medium may be provided in bead form. Beads, for example, may be packed into a diluate compartment providing an ion exchange medium having the desired porosity and other properties.

As described herein, the ion exchange medium may be positioned in a single diluate compartment or multiple diluate compartments. In some embodiments, an ion exchange medium is positioned in each diluate compartment of the membrane stack. Positioning the ion exchange medium in a diluate compartment can significantly lower the electrical resistance of the compartment. In some embodiments, the electrical resistance of the diluate compartment is reduced by at least an order of magnitude. For example, a diluate compartment having an ion exchange medium positioned therein can have an electrical resistance of 0.1-5 k$\Omega$ at 0.0001-1% salinity. Reducing electrical resistance of diluate compartments can lower membrane stack resistance leading to enhanced power generation of a reverse electrodialysis system. A reduction in stack resistance can translate to significantly less membrane surface area required for commercial electric power generation making reverse electrodialysis systems more economically viable.

Additionally, in some embodiments, the ion exchange medium can be positioned in concentrate compartments.

Reverse electrodialysis systems described herein can be stationary or portable. In being portable, reverse electrodialysis systems can be transported to various sites for electrical production and can operate as stand-alone units.

II. Methods of Making a Reverse Electrodialysis System

In another aspect, methods of making reverse electrodialysis systems are described herein. A method of making a reverse electrodialysis system comprises providing a membrane stack comprising alternating anion and cation exchange membranes defining diluate and concentrate ionic solution compartments. An ion exchange medium is positioned in the diluate compartment and an anode and cathode are positioned adjacent to the membrane stack. In some embodiments, the anion and cation exchange membranes define a plurality of diluate compartments and concentrate compartments wherein the ion exchange medium is positioned in the diluate compartments. The anode and cathode are connected to an external electric circuit for the production of electrical current.

Reverse electrodialysis systems fabricated according to methods described herein can have any construction and properties described in Section I above. For example, components used to fabricate a reverse electrodialysis system including anode, cathode, anion and cation exchange membranes and ion exchange medium can have any construction and properties recited for the same in Section I above.

III. Methods of Generating Electrical Current

In another aspect, methods of generating electrical current are described herein. A method of generating electrical current comprises providing a reverse electrodialysis system comprising an anode and cathode adjacent to a membrane stack, the membrane stack comprising alternating anion and cation exchange membranes defining diluate and concentrate ionic solution compartments, wherein an ion exchange medium is positioned in the diluate compartment. Dilute ionic solution is flowed into the diluate compartment and concentrated ionic solution is flowed into the concentrate compartment. Anions from the concentrated ionic solution are passed through the anion exchange membrane in a direction toward the anode and cations from the concentrated ionic solution are passed through the cation exchange membrane in a direction toward the cathode. An external electrical circuit is connected to the anode and cathode to extract electrical current from the reverse electrodialysis system.

In some embodiments, the anion and cation exchange membranes define a plurality of diluate compartments and concentrate compartments, wherein the ion exchange medium is positioned in the diluate compartments. Dilute ionic solution is flowed into the diluate compartments and concentrated ionic solution is flowed into the concentrate compartments. Anions from the concentrated ionic solution are passed through the anion exchange membranes in a direction toward the anode and cations from the concentrated ionic solution are passed through the cation membranes in a direction toward the cathode. An external electrical circuit is connected to the anode and cathode to extract electrical current from the reverse electrodialysis system.

Reverse electrodialysis systems employed in methods of generating electrical current described herein can have any construction and/or properties described in Section I above. For example, components of a reverse electrodialysis system including anode, cathode, anion and cation exchange membranes and ion exchange medium can have any construction and properties recited for the same in Section I above. Further, dilute ionic solution and concentrated ionic solution can have properties recited in Section I and can be obtained from the various sources described in Section I, including fresh and salt bodies of water or water used in hydraulic fracturing operations.

IV. Methods of Reducing Membrane Stack Resistance

In a further aspect, a method of reducing membrane stack resistance in a reverse electrodialysis system is described herein. Such a method comprises positioning an ion exchange medium in one or more diluate compartments of the electrodialysis system, wherein the stack resistance is reduced by at least an order of magnitude relative to an identical or substantially identical membrane stack not employing the ion exchange medium. The reverse electrodialysis system can have any construction and/or properties described in Section I above. For example, components of a reverse electrodialysis system including anode, cathode, anion and cation exchange membranes can have any construction and properties recited for the same in Section I above. Further, the ion exchange medium in one or more of the diluate compartments can have any construction and/or properties recited in Section I above.

In some embodiments, the stack resistance is reduced by 1-3 orders of magnitude by positioning the ion exchange medium in one or more diluate compartments of the electrodialysis system. Reduction of the stack resistance can be derived from a reduction in the electrical resistance of the diluate compartment(s). A diluate compartment comprising the ion exchange medium, for example, can demonstrate a resistance of 0.1-5 k$\Omega$ at 0.0001-1% salinity. This is in contrast to a diluate compartment not comprising the ion exchange medium, wherein the resistance of the compartment is 5-50 k$\Omega$.

These and other embodiments are further illustrated in the following non-limiting example.

Example 1—Reverse Electrodialysis System

A reverse electrodialysis system having a construction illustrated in FIG. 1 was constructed. The cation exchange membranes were Fumasep FKS and the anion exchange membrane was Fumasep FAS. The diluate and concentrate compartments each held 10 mL, having dimensions of 12 cm×7 cm. An ion exchange medium was positioned in the diluate compartment. The ion exchange medium was in the form of a porous wafer. The ion exchange wafer was synthesized by providing a mixture of 23 g anion exchange resin, 23 g cation exchange resin, 10 g of polyethylene and 15 g of sugar. The mixture was placed in a pneumatic press at 237° F. and 10,000 psi for a time period of 90 minutes. The formed wafer was then cooled and submersed in water to dissolve the sugar, providing porosity to the ion exchange wafer. The wafer was subsequently mechanically worked to shape and dimensions for placement in the diluate chamber.

A comparative electrodialysis system was also constructed the sole difference being that the diluate compartment did not comprise the ion exchange medium.

Stack resistances for the two reverse electrodialysis systems were determined at various salt concentrations as set forth in Tables IV and V.

TABLE IV

Stack Resistance with Ion Exchange Medium

| Salt Conc. (g/L) | Resistance 1 | Resistance 2 | Resistance 3 | Average | Std. Error |
|---|---|---|---|---|---|
| 30 | 0.5 | 0.6 | 0.64 | 0.58 | 0.0416 |
| 35 | 0.5 | 0.55 | 0.51 | 0.52 | 0.0153 |
| 45 | 0.56 | 0.61 | 0.58 | 0.58 | 0.0145 |

TABLE V

Stack Resistance without Ion Exchange Medium

| Salt Conc. (g/L) | Resistance 1 | Resistance 2 | Resistance 3 | Average | Std. Error |
|---|---|---|---|---|---|
| 30 | 23 | 13 | 17 | 17.67 | 2.91 |
| 35 | 12.8 | 15 | 13 | 13.6 | 0.702 |
| 45 | 14 | 16.7 | 16.2 | 15.63 | 0.829 |

Figure 2:
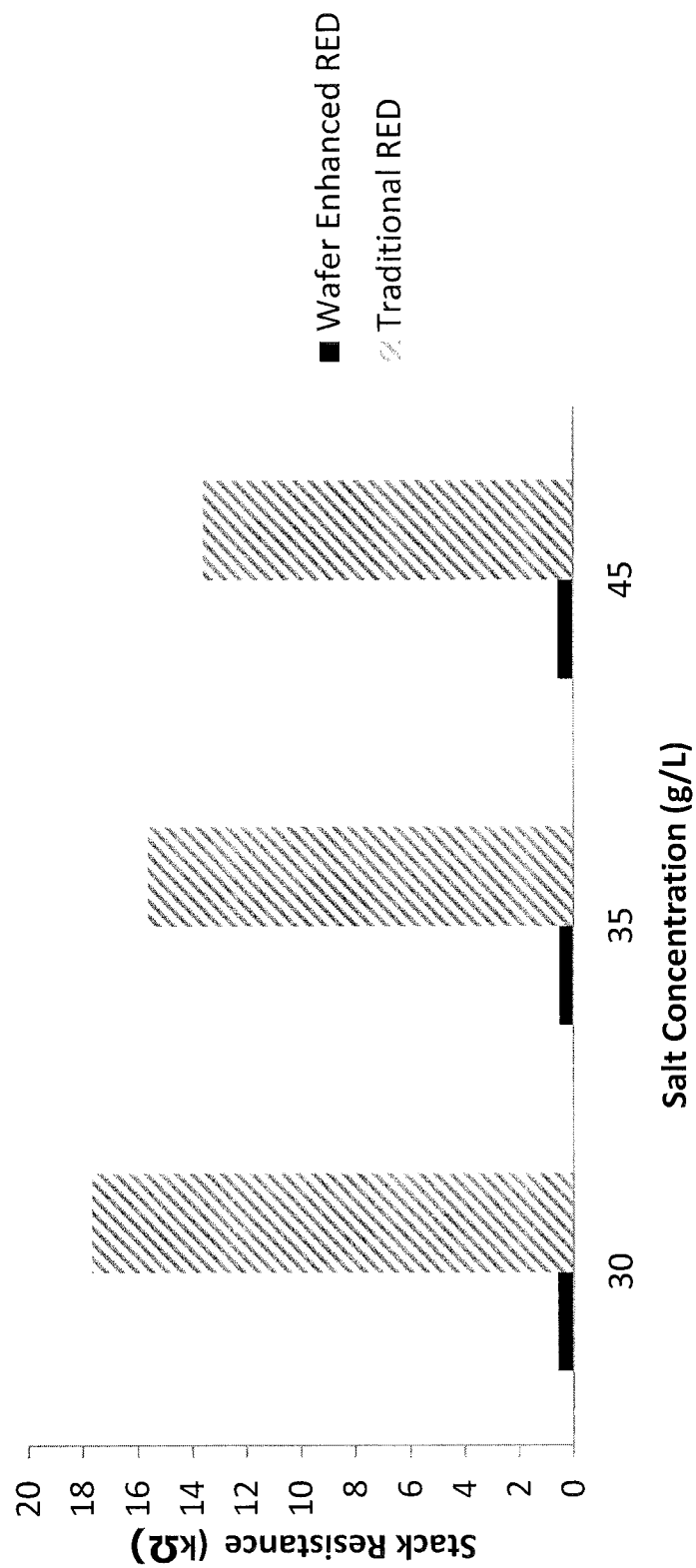
FIG. 2 illustrates reduction in stack resistance of a reverse electrodialysis system having a construction described herein relative to a reverse electrodialysis system of prior construction.

The results of provided in Tables IV and V are further illustrated in FIG. 2. As detailed in the results, stack resistance is reduced an order of magnitude by placement of the ion exchange medium in the diluate chamber.

These substantial decreases in stack resistance demonstrated in Table IV translate to projected power densities for reverse electrodialysis systems employing ion exchange media in diluate compartments of various stack constructions as set forth in Table VI.

TABLE VI

Projected Power Densities for Reverse Electrodialysis Systems Employing Ion Exchange Media

| $V_{applied}$ (V) | $R_{cell\ pair}$ ($\Omega$) | Number of Cell Pairs | $R_{stack\ total}$ ($\Omega$) | Power Density (W/m$^2$) |
|---|---|---|---|---|
| 2 | 0.8 | 12 | 9.6 | 16.7 |
| 2.5 | 1.76 | 14 | 24.6 | 8.7 |
| 3 | 2.08 | 17 | 35.4 | 7.3 |
| 3.5 | 2.52 | 20 | 50.4 | 5.9 |
| 4 | 1.1 | 23 | 25.3 | 13.5 |
| 4.5 | 0.32 | 25 | 8.0 | 49.6 |

For comparative purposes, projected power densities for reverse electrodialysis systems of various stack constructions not incorporating ion exchange media in the diluate compartments are provided in Table VII. The projections of Table VII are based on the stack resistance values of Table V.

TABLE VII

Projected Power Densities for Reverse Electrodialysis Systems of Traditional Constructions

| $V_{applied}$ (V) | $R_{cell\ pair}$ (Ω) | Number of Cell Pairs | $R_{stack\ total}$ (Ω) | Power Density (W/m²) |
|---|---|---|---|---|
| 2 | 8.2 | 12 | 98.4 | 1.6 |
| 2.5 | 5.08 | 14 | 71.12 | 3.0 |
| 3 | 2.56 | 17 | 43.52 | 5.9 |
| 3.5 | 2.54 | 20 | 50.8 | 5.9 |
| 4 | 1.86 | 23 | 42.78 | 8.0 |
| 4.5 | 1.86 | 25 | 46.5 | 8.5 |

It is clear from Tables VI and VII that employment of an ion exchange medium in one or more diluate compartment of a reverse electrodialysis system significantly enhances power density of the system, especially at low applied voltage. Power densities were obtained by applying a voltage to the RED stack to simulate high cell pairs. The resulting current obtained from this applied voltage was then used in conjunction with the calculated resistance to determine the power output and power density.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A reverse electrodialysis system comprising:
    an anode electrode and a cathode electrode adjacent to a membrane stack, the membrane stack comprising alternating anion and cation exchange membranes defining a diluate compartment and a concentrate ionic solution compartment;
    an ion exchange medium positioned in the diluate compartment, the ion exchange medium comprising a binding agent and a cation exchange resin, anion exchange resin, or a combination of both resins; and
    an external applied voltage across the membrane stack;
    wherein the diluate compartment comprising the ion exchange medium has an electrical resistance of 0.1-5 kΩ at 0.0001-1% salinity.

2. The reverse electrodialysis system of claim 1, wherein the anion and cation exchange membranes define a plurality of diluate compartments and concentrate compartments, wherein the ion exchange medium is positioned in the diluate compartments.

3. The reverse electrodialysis system of claim 1, wherein the ion exchange medium comprises a porous wafer including the cation exchange resin, anion exchange resin or combination thereof.

4. The reverse electrodialysis system of claim 3, wherein the wafer has porosity of 30-60%.

5. The reverse electrodialysis system of claim 3, wherein the wafer has a surface area of at least 400 m2/g.

6. The reverse electrodialysis system of claim 1, wherein the anode and cathode are connected to an external electrical circuit for the production of electrical current.

7. The reverse electrodialysis system of claim 1 further comprising ionic solutions in the diluate and concentrate compartments.

8. The reverse electrodialysis system of claim 7, wherein the ionic solution of the diluate compartment or concentrate compartment comprises multivalent ions.

9. The reverse electrodialysis system of claim 7, wherein the ionic solution of the concentrate compartment is derived from water used in hydraulic fracking operations.

10. The reverse electrodialysis system of claim 7, wherein the ionic solution of the concentrate compartment is derived from a natural salt water body and the ionic solution of the diluate compartment is derived from a natural fresh water body.

11. The reverse electrodialysis system of claim 1, wherein the system is portable.

12. The reverse electrodialysis system of claim 11, wherein the electrodes are operable for connection to electrical circuits having differing loads.

13. A method of generating electrical current comprising:
    providing a reverse electrodialysis system comprising an anode and cathode adjacent to a membrane stack, the membrane stack comprising alternating anion and cation exchange membranes defining a diluate compartment and a concentrate ionic solution compartment, wherein an ion exchange medium is positioned in the diluate compartment and comprises a cation exchange resin, anion exchange resin, or a combination of both resins;
    flowing dilute ionic solution into the diluate compartment and concentrated ionic solution into the concentrate compartment;
    applying an external voltage across the membrane stack;
    passing anions from the concentrated ionic solution through the anion exchange membrane in a direction towards the anode and passing cations from the concentrated ionic solution through the cation exchange membrane in a direction toward the cathode; and
    connecting an external electrical circuit to the anode and cathode to extract electrical current from the reverse electrodialysis system.

14. The method of claim 13, wherein the anion and cation exchange membranes define a plurality of diluate compartments and concentrate compartments, wherein the ion exchange medium is positioned in the diluate compartments.

15. The method of claim 14, wherein the dilute ionic solution is flowed into the diluate compartments and concentrate ionic solution is flowed into the concentrate compartments.

16. The method of claim 15, wherein anions from the concentrated ionic solution are passed through the anion exchange membranes in a direction towards the anode and cations from the concentrated ionic solution are passed through the cation exchange membranes in a direction towards the cathode.

17. The method of claim 13, wherein the ion exchange medium comprises cation exchange resin, anion exchange resin or combinations thereof.

18. The method of claim 13, wherein the ion exchange medium comprises a porous wafer including the cation exchange resin, anion exchange resin or combination thereof.

19. A reverse electrodialysis system comprising:
    an anode and cathode adjacent to a membrane stack, the membrane stack comprising alternating anion and cation exchange membranes defining diluate and concentrate ionic solution compartments, wherein an ion exchange medium is positioned in the diluate compartment; and
    an external applied voltage across the membrane stack.

20. The reverse electrodialysis system of claim 19, wherein the ion exchange medium comprises a porous wafer including a cation exchange resin, anion exchange resin, or combination thereof.

\* \* \* \* \*